(12) United States Patent
Hoefler et al.

(10) Patent No.: US 8,930,108 B2
(45) Date of Patent: Jan. 6, 2015

(54) METHOD FOR ACTUATING A RETARDER OF A MOTOR VEHICLE

(75) Inventors: Hans Hoefler, Immenstaad (DE); Norbert Brugger, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/988,378

(22) PCT Filed: Nov. 7, 2011

(86) PCT No.: PCT/EP2011/069552
§ 371 (c)(1),
(2), (4) Date: May 20, 2013

(87) PCT Pub. No.: WO2012/079844
PCT Pub. Date: Jun. 21, 2012

(65) Prior Publication Data
US 2013/0253794 A1    Sep. 26, 2013

(30) Foreign Application Priority Data

Dec. 13, 2010    (DE) .......................... 10 2010 062 947

(51) Int. Cl.
| | | |
|---|---|---|
| G06F 7/70 | (2006.01) | |
| B60T 7/06 | (2006.01) | |
| B60T 7/04 | (2006.01) | |
| B60T 10/02 | (2006.01) | |
| B60T 17/22 | (2006.01) | |
| G05G 1/38 | (2008.04) | |

(52) U.S. Cl.
CPC . B60T 7/06 (2013.01); B60T 7/042 (2013.01); B60T 10/02 (2013.01); B60T 17/22 (2013.01); G05G 1/38 (2013.01)
USPC ............................................ 701/70; 701/110

(58) Field of Classification Search
USPC .................................................. 701/110, 70
See application file for complete search history.

(56) References Cited

U.S. PATENT DOCUMENTS

| | | | |
|---|---|---|---|
| 8,306,716 B2 | 11/2012 | Burkhart et al. | |
| 2004/0162187 A1* | 8/2004 | Suzuki ............................ | 477/182 |
| 2005/0015196 A1* | 1/2005 | Hawkins ........................ | 701/110 |
| 2005/0090365 A1* | 4/2005 | Tamai et al. ....................... | 477/5 |
| 2007/0184936 A1* | 8/2007 | Nakayama ....................... | 477/44 |
| 2007/0276582 A1 | 11/2007 | Coughlin | |
| 2007/0287595 A1* | 12/2007 | Kobiki et al. ................... | 477/182 |
| 2008/0042489 A1 | 2/2008 | Lewis et al. | |
| 2008/0097674 A1* | 4/2008 | Kuwahara et al. .............. | 701/51 |
| 2010/0049387 A1* | 2/2010 | Aoki ................................ | 701/22 |
| 2010/0063698 A1* | 3/2010 | Lee et al. ........................ | 701/67 |
| 2010/0298088 A1* | 11/2010 | Rouis et al. ...................... | 477/3 |
| 2012/0041651 A1* | 2/2012 | Uematsu et al. ................ | 701/50 |
| 2012/0136506 A1* | 5/2012 | Takeuchi et al. .................. | 701/1 |
| 2012/0150409 A1* | 6/2012 | Ogawa et al. ................... | 701/71 |

FOREIGN PATENT DOCUMENTS

| | | |
|---|---|---|
| DE | 44 20 116 A1 | 12/1995 |
| DE | 198 27 604 A1 | 12/1999 |
| DE | 10 2007 018 153 A1 | 10/2008 |
| DE | 10 2008 034 974 A1 | 2/2010 |
| EP | 1 427 623 B1 | 2/2010 |

OTHER PUBLICATIONS

German Search Report Corresponding to 10 2010 062 947.2 mailed Oct. 5, 2011.
International Search Report Corresponding to PCT/EP2011/069552 mailed Feb. 16, 2012.
Written Opinion Corresponding to PCT/EP2011/069552 mailed Feb. 16, 2012.
International Preliminary Examination Report Corresponding to PCT/EP2011/069552 mailed Dec. 14, 2012.

* cited by examiner

*Primary Examiner* — Hussein A. Elchanti
(74) *Attorney, Agent, or Firm* — Davis & Bujold, PLLC; Michael J. Bujold

(57) ABSTRACT

A method of actuating a retarder of a motor vehicle, for example a hydrodynamic retarder of a commercial vehicle, in which during overrun operation the driver uses an operating element to call for a braking action by the retarder. To implement the method simply, conveniently and inexpensively, the accelerator pedal of the motor vehicle is used as the operating element for demanding a braking action by the retarder. In such manner that when the torque of the drive engine of the motor vehicle becomes negative due to overrun operation, the braking action demand is signaled by at least partially releasing the accelerator pedal.

5 Claims, No Drawings

METHOD FOR ACTUATING A RETARDER OF A MOTOR VEHICLE

This application is a National Stage completion of PCT/EP2011/069552 filed Nov. 7, 2011, which claims priority from German patent application serial no. 10 2010 062 947.2 filed Dec. 13, 2010.

FIELD OF THE INVENTION

The invention concerns a method for actuating a retarder of a motor vehicle.

BACKGROUND OF THE INVENTION

Retarders are used in motor vehicles as additional, wear-free permanent braking devices for relieving the load on the wheel or service brakes in the form of friction brakes. Particularly in vehicles having a high overall weight, in braking processes at high speed, when driving down steep slopes, when the road conditions on downhill stretches are difficult and require frequent braking, and when driving over long downhill stretches, retarders prevent the premature wear and thermal overloading of the friction brakes.

Essentially, the retarders used are electrodynamic retarders in which a braking torque is produced by the conversion of mechanical into kinetic energy. In commercial vehicles such as articulated dumper trucks, cargo trucks or buses, hydrodynamic retarders are often used.

In a hydrodynamic retarder the mechanical energy of a driveshaft is converted into kinetic energy of a liquid, usually oil. The physical principle of action corresponds to that of a hydrodynamic clutch having a pump impeller wheel driven by an internal combustion engine as its drive input and a turbine wheel as its drive output, wherein however the turbine is stationary. Accordingly, a hydrodynamic retarder comprises a rotor arranged in the power flow and a stator with blades, which is in fixed connection to a retarder housing.

When the retarder is actuated, a quantity of oil corresponding to the desired braking power is introduced into the retarder space. During this the oil flow is regulated for example by means of an electric proportional valve, whose magnet is energized with an appropriate current. In the retarder space the rotating rotor entrains the oil, which encounters the stator blades, converting the kinetic flow energy into heat, whereby a braking action is produced on the rotor and its driving shaft, thus braking the vehicle as a whole. To cool the oil, it is passed through a heat exchanger.

The braking torque of hydrodynamic retarders is usually controlled by producing a corresponding pressure in the hydrodynamic retarder circuit, which is determined by a control and regulating unit. The relationship between a corresponding control parameter of the control and regulating unit, for example a current in the proportional valve, and the braking torque that results therefrom, is determined for example by a performance characteristic. Thus, the braking power can be adjusted by means of an operating element that controls the current supplied to the proportional valve.

In known motor vehicles the operating elements for actuating the retarder are usually in the form of a continuously variable or stepped sensors or switches which are either separate, or attached to the brake pedal. The braking torque of the retarder is then controlled manually by the driver, for example by way of a steering arm switch or by way of the braking foot.

For example, EP 1 427 623 B1 shows an arrangement in which a hydrodynamic retarder is controlled as a function of the brake pedal position at the time, wherein the oil flow through the retarder is adjusted by means of a proportional valve. In this case the difference between a desired braking action signaled by the brake pedal position and a measured braking action actually being provided is detected and if necessary corrected by appropriate actuation of the proportional valve.

DE 198 27 604 B4 discloses as an example a hydrodynamic retarder in which stepped regulation for adjusting the braking torque of the hydrodynamic retarder is possible.

DE 10 2008 034 974 A1 describes as an example a method for adjusting the braking torque of a hydrodynamic retarder, in which a manual specification of the power transfer level of the retarder can be given by way of a selector lever. The method is also suitable for automatic specification of the power transfer, for example by means of a speed regulating unit.

From DE 10 2007 018 153 A1 a method is known, in which a nominal speed of a vehicle in overrun operation is controlled by a continuously variable retarder and/or engine brake actuating system. In this method, when a defined event occurs, for example when the accelerator pedal is released, the driving speed at the time is kept constant. A brief actuation of the brake pedal reduces the nominal speed by a determined amount. If the brake pedal is actuated for a longer time the nominal speed is continuously reduced farther until the brake pedal is released again. The driver can reduce the braking force some more and increase the nominal speed by actuating a suitable operating element. That can be for example the accelerator pedal, and for this the initial section of the pedal's path in which no torque demand is yet made on the engine is used. The operating element can also be the brake pedal or a brake lever, if it is designed so that it can be pulled back in a backward direction opposite to its normal actuation direction. The retarder's braking torque itself is regulated by means of an electronic control unit in such manner that the nominal speed is maintained, whereby the retarder is given priority over the service brake and the engine braking torque is also taken into account.

The disadvantage of the known methods for retarder actuation is that they make possible a manual controlled adjustment of the braking torque of the retarder only either by hand or by the action of the braking foot on the brake pedal. The known method for maintaining a nominal speed during overrun operation first requires the brake pedal to be actuated in order to set a desired nominal speed, and then if necessary the actuation of some other operating element, or at least a rather unaccustomed backward pulling motion of an appropriately designed brake pedal, in order to be able to change the previously set nominal speed. Thus, the operating convenience of known retarders for controlling the braking torque is rather troublesome for the driver and is therefore not optimal.

SUMMARY OF THE INVENTION

Against this background the purpose of the present invention is to provide a method for the manually operated actuation of a retarder during overrun operation of an appropriately equipped vehicle, which is convenient and which functions in a simple manner.

BACKGROUND OF THE INVENTION

The invention is based on the recognition that in a driving situation of a vehicle when the drive engine's torque is negative, i.e. during overrun operation, the degree of throttle closure by the driver can be interpreted as a measure of the wish for a particular braking torque by an existing retarder. In accordance with this driver's wish, the braking power of the retarder should be able to be adjusted in a controlled manner by means of the accelerator pedal.

Accordingly, the invention starts from a method for actuating a retarder of an motor vehicle, for example a hydrodynamic retarder of a commercial vehicle, in which during overrun operation an operating element is used to indicate a demand by the driver for a braking power of the retarder. To achieve the stated objective the invention provides that the accelerator pedal of the motor vehicle is used to call for a braking power of the retarder, and this in such manner that when the torque of the motor vehicle's engine becomes negative because of the overrun operation, the braking power demand is signaled by an at least partial release of the accelerator pedal.

Accordingly, in this method the driving or accelerator pedal is used during overrun operation as the operating element of the retarder and the retarder is controlled by the deflection of the accelerator pedal. This has the advantageous result that the braking demand on the retarder is made in a logical manner when the throttle is closed without having to manipulate a separate switch or lever, or to operate the brake pedal an any particular way. Thus, the retarder is operated without any additional, bothersome actions by the driver and therefore very simply and conveniently.

Accordingly, the retarder actuation can be initiated in a simple manner since a signal from a suitable sensor in the area of the accelerator pedal is detected and used as soon as the torque of the drive engine becomes negative, i.e. when the drive engine changes to overdrive mode when the driver throttles down, i.e. when the accelerator pedal is moved in the release direction.

In particular it can be provided that the retarder braking torque is adjusted as a function of the accelerator pedal's position, in such manner that the adjustment can advantageously take place continuously variably. It can also be provided that if the accelerator pedal is released completely the maximum available retarder braking torque is demanded and consequently delivered, since in such a case it can be assumed that there is a great need to brake the vehicle and perhaps to relieve the strain on the service brakes during overrun operation. On the other hand, if the accelerator pedal is partially released only a part of the maximum retarder braking torque is called for and delivered. Since if the throttle is closed during overrun operation the retarder is activated, the braking torque can be adjusted continuously variably by means of the accelerator pedal so long as the engine torque remains negative. When throttling up, i.e. when the sign of the engine torque changes from negative to positive, the retarder is deactivated again.

With a hydrodynamic retarder the accelerator pedal position can be used to determine a current supply for the control of a proportional valve. By means of the proportional valve the braking power of the retarder can be adjusted in the manner described earlier. Thus, in accordance with the accelerator pedal position at the time, a continuously variable adjustment of the retarder braking torque of a hydrodynamic retarder can be achieved.

Basically, however, the method can also be used with retarders that operate with other working principles and in such cases, instead of a proportional valve some other appropriate control element is actuated as a function of the accelerator pedal position.

The method according to the invention can be combined particularly advantageously with an Electronic Gas Pedal System (EGAS) known per se. By means of such an EGAS system the accelerator pedal position at any time is already notified in the form of a signal to a data bus (CAN) and can be used for the continuously variable adjustment of the retarder's braking torque by way of the accelerator pedal.

Furthermore, it can be provided that for the adjustment of the retarder's braking torque only part of the available accelerator pedal displacement path is used. Correspondingly, an upper accelerator pedal position can be set as the actuation threshold, below which the pedal-path-dependent retarder braking torque adjustment is actuated. A lower accelerator pedal position can be set as a maximum threshold, below which a maximum value of the retarder braking torque is called for.

In such a case the retarder is only activated from beyond a particular accelerator pedal position in the release direction, for example 40% of the accelerator pedal's path. Below a certain accelerator pedal position, i.e. when the pedal is almost fully released, for example at 10% of its path, the full retarder braking torque is always actuated. The continuously variable adjustment of the retarder braking torque can then be used within the set part-section of the pedal path, namely in this example between the 40% and 10% accelerator pedal positions. If the accelerator pedal is then actuated in the direction calling for an engine torque, the previously actuated retarder can be deactivated again when the pedal displacement passes the actuation threshold or when the reversion of the previously negative engine torque to a positive engine torque is recognized.

Furthermore, it can be provided that for the retarder braking torque adjustment, a preselected maximum value of the retarder braking torque is taken into account. In this way the adjustment according to the invention can be combined with a preselector switch known per se, which preselects a maximum possible retarder braking torque which can then be actuated in a controlled manner by means of the accelerator pedal.

As an example embodiment of the invention, a scenario is assumed, in which an articulated dumper truck driven by an internal combustion engine and equipped with an Electronic Gas Pedal (EGAS) and a proportional-valve-controlled hydrodynamic retarder is in use and starts driving downhill.

The driver throttles down. Owing to the beginning of the vehicle's overrun operation the torque of the drive engine of the dumper's tractor becomes negative. As soon as the engine torque is recognized by a suitable control unit as negative, the signal from the accelerator pedal or the pedal position is used to actuate the retarder. The value of the current accelerator pedal position at the time is provided in the form of a signal to the CAN bus of the EGAS system, which includes an accelerator pedal module with sensors to detect the pedal position, and an engine control unit and an electrically actuated throttle device of the drive engine of the vehicle in the form of an internal combustion engine.

By virtue of the current accelerator pedal position or pedal signal, the current supplied to a magnet of the electric proportional valve is regulated by means of a control and regulating unit in such manner that a certain oil flow is fed into the retarder space. This produces a corresponding pressure in the retarder space, whereby a certain braking torque is produced on the rotor of the retarder, which acts upon the drive-train of the vehicle and the driven vehicle wheels and thus leads to braking of the vehicle. The relationship between the accelerator pedal position, the current at the proportional valve as the control parameter of the control and regulating unit, and the resulting braking torque, is stored in the form of a performance characteristic. In addition, as a boundary condition part of the pedal displacement path bounded by an actuation threshold and a maximum threshold is also defined.

If the driver has fully released the accelerator pedal, the maximum retarder torque is called for. The maximum value can be set in advance by means of a preselector switch if one is provided. If the driver has only partially released the accelerator pedal, then the retarder is actuated below an accelerator pedal position corresponding to 40% of the pedal path. If the accelerator pedal is depressed beyond the 40% mark the retarder remains deactivated. Thus, by means of the accelerator pedal the driver can now continuously adjust the retarder torque in a virtually intuitive manner so as to produce a desired resultant braking action on the vehicle. If the accelerator pedal has been depressed by 10% or less of the pedal path, the controlled phase is terminated and the full retarder torque is called for. Thus, an accelerator pedal position of less than 10% of the pedal path is regarded as equivalent to full release of the accelerator pedal.

If the driver actuates the accelerator pedal so as to accelerate the vehicle or reduce its braking, for example if the downhill stretch becomes level, the control phase of the retarder torque is re-established. If the engine torque reverts to positive so that the vehicle is in traction operation, or if the 40% pedal path actuation threshold is exceeded in the direction of higher pedal path percentages, then the control phase of the retarder braking torque is terminated and the retarder is deactivated.

Thus, by means of the accelerator pedal, within the pedal path range between 40% and 10% of the possible pedal displacement path, the driver can increase the retarder torque in the pedal release direction or reduce it in the pedal actuating direction, and on moving outside the control range, depending on the pedal movement direction, the retarder can be fully activated or fully deactivated, as necessary, so that the driving of the dumper truck can be controlled conveniently and simply during overrun operation, while the service brakes are treated with care.

The invention claimed is:

1. A method of actuating a retarder for a motor vehicle during overrun operation of the motor vehicle, the method comprising the steps of:
    monitoring engine torque with a control unit;
    when a negative engine torque is recognized, monitoring a position of an accelerator pedal via sensor signals that are delivered to the control unit;
    actuating a retarder to apply retarder braking torque;
    applying a retarder braking torque when the accelerator pedal is released to a threshold pedal position, and while the engine torque is recognized as being negative;
    adjusting the retarder braking torque proportionally to the accelerator pedal position when the accelerator pedal is released to pedal positions between the threshold pedal position and a second pedal position, and while the engine torque is recognized as being negative; and
    applying a maximum retarder braking torque when the accelerator pedal is released to pedal positions beyond the second pedal position, and while the engine torque is recognized as being negative.

2. The method of actuating a retarder according to claim 1, further comprising the steps of:
    defining a first range of pedal positions as being positions of the accelerator pedal from a fully actuated pedal position, at which the accelerator pedal is fully actuated, to the threshold pedal position;
    defining a second range of pedal positions as being positions of the accelerator pedal between the threshold pedal position and the second pedal position; and
    defining a third range of pedal positions as being positions of the accelerator pedal from the second pedal position to a fully released pedal position at which the accelerator pedal is fully released.

3. The method of actuating a retarder according to claim 2, further comprising the steps of:
    actuating the retarder to apply the maximum retarder braking torque when the pedal position of the accelerator pedal is in the third range of pedal positions, and while the engine torque is recognized as being negative;
    variably actuating the retarder to continuously adjust the retarder braking torque proportionally to the accelerator pedal position when the accelerator pedal is positioned in the second range of pedal positions, and while the engine torque is recognized as being negative;
    deactuating the retarder to apply no retarder braking torque when the pedal position of the accelerator pedal is in the first range of pedal positions.

4. The method of actuating a retarder according to claim 1, further comprising the step of deactuating the retarder to apply no retarder braking torque when the engine torque is recognized as being positive.

5. The method of actuating a retarder according to claim 2, further comprising the steps of:
    defining a pedal path in an actuation direction as extending from the fully released pedal position to the fully actuated pedal position;
    defining the threshold pedal position as being a pedal position at which the accelerator pedal is approximately 40% actuated; and
    defining the second pedal position as being a pedal position at which the accelerator pedal is approximately 10% actuated.

* * * * *